United States Patent [19]

Michaud et al.

[11] 4,037,703

[45] July 26, 1977

[54] BLOCKING DEVICE FOR CARD OR VOUCHER READERS DESIGNED FOR PUBLIC USE

[75] Inventors: Andre Michaud, Chatenay Malabry; Bernard Chalus, Arpajon, both of France

[73] Assignee: Transac - Compagnie Pour le Developpment des Transactions Automatiques, Paris, France

[21] Appl. No.: 640,298

[22] Filed: Dec. 12, 1975

[30] Foreign Application Priority Data

Dec. 20, 1974 France .............................. 74.42225

[51] Int. Cl.² ............................................. G07F 7/00
[52] U.S. Cl. ................................ 194/97 R; 194/4 G; 194/DIG. 20; 235/61.11 R
[58] Field of Search ............... 194/1 E, 4 R, 4 B, 4 C, 194/4 D, 4 E, 4 F, 4 G, DIG. 20, 97 R; 235/61.11 R; 232/43.1, 43.4, 65

[56] References Cited

U.S. PATENT DOCUMENTS

| | | | |
|---|---|---|---|
| 3,575,271 | 4/1971 | Constable et al. | 194/4 R |
| 3,850,299 | 11/1974 | Kreitzer | 209/DIG. 2 |

*Primary Examiner*—Robert B. Reeves
*Assistant Examiner*—Joseph J. Rolla
*Attorney, Agent, or Firm*—Sughrue, Rothwell, Mion, Zinn and Macpeak

[57] ABSTRACT

A device enabling blocking of a slot formed in a wall separating two mediums and the free access, in the open position, from one medium to the other, of a flat object, characterized in that it comprises a cylindrical element pivoted about its axis placed in front of the said slot, having an elongated radial opening therethrough, the said cylinder being provided with a drive member for rotating the same and a position control for stopping said cylinder in predetermined positions.

3 Claims, 7 Drawing Figures

4,037,703

BLOCKING DEVICE FOR CARD OR VOUCHER READERS DESIGNED FOR PUBLIC USE

BACKGROUND OF THE INVENTION

1. Field of the Invention

The invention has as its object a device enabling the blocking of an opening formed in a wall separating two mediums and the free passing, in the open position, from one medium to the other, of flat objects such as, for example, cards of the type presently used for withdrawing money from automatic distributors in which such cards are inserted.

2. DESCRIPTION OF THE PRIOR ART

The device according to the invention applies to all appliances using a card or a voucher of any sort the automatic processing of which must be protected from any interference or disturbance with fraudulent intent.

For stopping up such automatic appliances, use is made at present of a plane stopping up element operating with a guillotine action, suitably actuated by an electromagnet.

Such stopping up devices do not make it possible to obtain the required protection.

Moreover, such stopping up devices with a guillotine action, made of sheet steel, are not very strong.

The aim of the present invention is to produce a strong stopping up device which prevents any fraud at the time of the insertion of a card.

SUMMARY OF THE INVENTION

The invention has as its object a device enabling the blocking of a slot formed in a wall separating two mediums and the free passage, in the open position, from one medium to the other, of flat objects and is characterized in that it comprises a cylindrical element which is pivoted about its axis, placed in front of the said passage, comprising an elongated radial opening therethrough, the said cylinder being provided with rotating means and means for stopping the cylinder rotation in predetermined positions.

According to a particular embodiment of the present invention, the said cylinder is accomodated in a guide block comprising a passage.

With reference to the accompanying figures, an example of embodiment of the invention, having no limiting character, will be described hereinbelow.

DESCRIPTION OF THE PREFERRED EMBODIMENT

Figure 1:
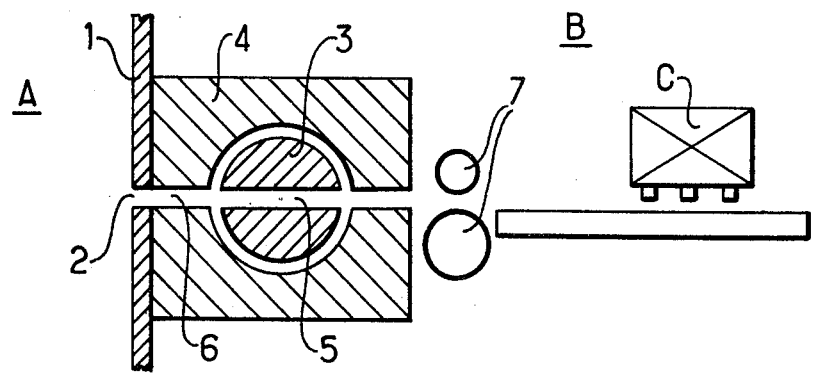
FIG. 1 shows a passage blocking device according to the invention.

FIG. 1 shows a wall 1 separating two mediums: a first outer medium A and a second inner medium B inaccessibile to the public. The wall 1 comprises a slot 2 intended to enable the inserting of a card in the medium B. This is the case, of example, of a card enabling the withdrawing of money, that card being required to be processed in the medium B by reading and recording apparatus C. The blocking device comprises a cylinder 3 rotatably placed inside a guide block 4. The axis of the cylinder 3 is placed parallel to the longitudinal dimension of that slot. The cylinder 3 comprises a radial opening 5 having a rectangular cross-section crossing through the cylinder. The guide block 4 comprises also a passage 6 extending to the slot 2 in the wall 1. The passage 6 crosses the guide block on either side of the cylinder 3. The slot 2, the passage 6 and the opening 5 therefore form a continuous access enabling the passing of a card from the medium A to the medium B or vice versa, when the cylinder 5 is in the position shown in FIG. 1. The stopping up of the slot 2 is obtained by the rotating of the cylinder 3. The cylinder 3 is driven in a rotating movement by a motor-gear reduction unit, not shown.

Figure 2A:
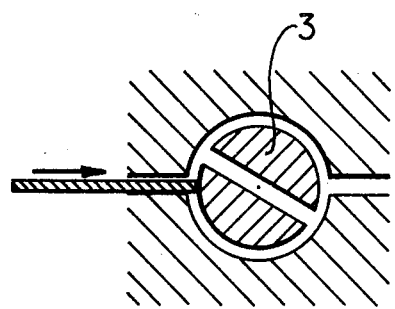
FIGS. 2a, 2b, 2c, and 2d shows the various stopping positions of the cylinder.
Figure 2B:
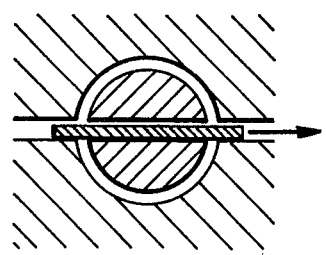

FIGS. 2a, 2b, 2c, 2d show the various stoppingg positions of the cylinder 3: in the waiting position, before the insertion of a card, the cylinder 3 is in the position shown in FIG. 2a, the radial opening of the cylinder 3 forming an angle of 20° with the passage 6 of the guide block 4. When a card is inserted in the slot 2 in the wall and the passage 6 in the guide block 4, it obstructs the light beam of a photo-electric device, not shown, this having the effect of controlling the rotating of the motor-gear reduction unit until the cylinder 3 reaches the position in FIG. 2b enabling the free access of the card into the inner medium B. The cylinder 3 is stopped in that position and in the subsequent positions by a device which will be described during the description of FIGS. 3 and 4. The card, which is pushed manually at the beginning, is then gripped by rollers 7 (FIG. 1) which bring it up to the reading and recording devices C.

Figure 2C:
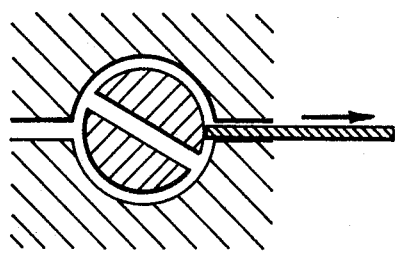
Figure 2D:
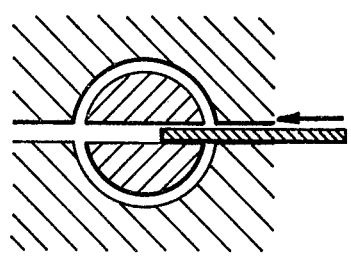

As soon as the back of the card has gone past the radial opening 5 of the cylinder 3, a rotation order is given and the cylinder stops in the passage closed position as shown in FIG. 2c at 160° from the previous position enabling free access. When the processing of the card by the apparatus C is ended, an order is given and the cylinder is set in the position shown in FIG. 2d enabling the restituting of the card; lastly, the card being restituted, the cylinder ends its cycle to return to the original position shown in FIG. 2a. The cylinder rotates always in the same direction so as to frustrate any attempted fraud by the use of string attached to the card.

Figure 3:
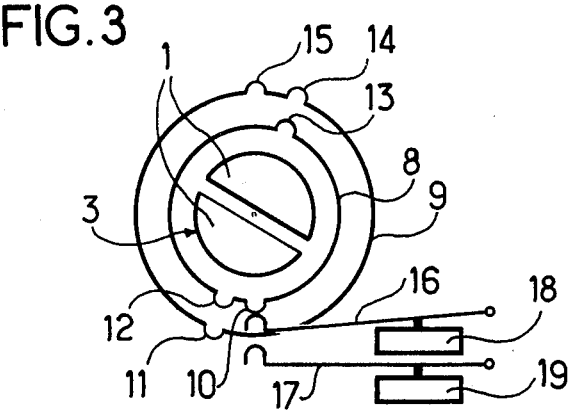
FIG. 3 shows a passage blocking cylinder according to the invention provided with two cam drums for controlling the stopping of the cylinder rotation motor.

FIG. 3 shows a device enabling the controlling of the stopping of the cylinder 3 in the positions shown in FIGS. 2a, 2b, 2c and 2d. The cylinder 3 is provided, for that purpose, for example, at one of its ends, with two ramps 8 and 9 bearing bosses 10, 11, 12, 13, 14 and 15, acting as cams for two collecting shoes 16 and 17 resting on the ramps 8 and 9 and actuating two switches 18 and 19 connected to a circuit which will be described with reference to FIG. 4.

Figure 4:
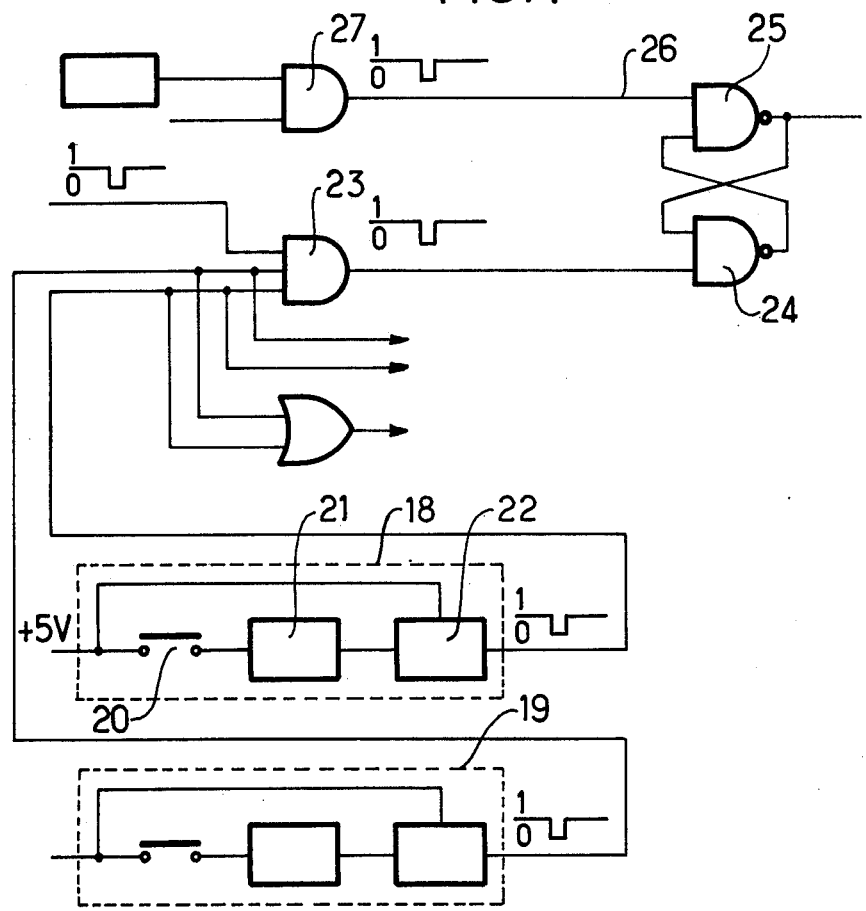
FIG. 4 shows a part of the logic control means connected with the blocking according to the invention.

The circuit in FIG. 4 is designed in such a way that the cylinder 3 stops its rotation each time at least one of the collecting shoes 16 or 17 presses onto on one of the bosses; these latter are therefore angularly arranged in positions corresponding to the stopping positions of the cylinder 3 in accordance with FIGS. 2a, 2b, 2c and 2d.

A single ramp bearing four bosses would be sufficient to fulfill that function. If two ramps having six bosses and two switches have been chosen, it is to be able to determine in what position the cylinder has stopped; indeed, either only the switch 13 is actuated, or only the switch 19 is actuated or both are actuated simultaneously. Therefore, three positions are determined: the third, which is that in which the two switches are actuated, leaves an incertitude and corresponds to two positions at 180° on the cylinder, the one corresponding to the card insertion position and the other corresponding to its restitution. If required, it would be possible to dissipate that incertitude by adding an extra ramp comprising a boss at the level of a radius on which there are already two and to add another switch.

As will be seen in FIG. 4, the switches 18 and 19 each comprise a +5V electricity supply, an actual switch 20, a shunt 21 and a Schmidt flip-flop 22 so as to generate a permanent positive signal when the collecting shoes 16 and 17 are not riding on one of the bosses and to set up a pulse by cancelling of that signal when the collecting shoes move off one of the bosses. Thus, two values represented by "0" and "1" are obtained and it is required to obtain a stopping of the motor-gear reduction unit each time there is an "0". The circuit comprises a logic "AND" gate 23, comprising three inputs connected respectively to the switch 18, to the switch 19 and to an output of a logic circuit controlling the various card processing operations, that output giving an order for stopping the motor-gear reduction unit by a pulse "0" in the case of emergency.

The "AND" gate therefore allows a pulse "0" to pass if there is a pulse "0" on any one of the three inputs or on several simultaneously. That "AND" gate is connected to a bistable element constituted by two logic "AND" elements 24 and 25. If a pulse "0" arrives on a first input 26 of the "AND" element 24, the bistable element changes over to "0" on the output of the "AND" element 25. That output controls the stopping or the starting of the motor-gear reduction unit, the state "0" of that output controlling the stopping.

The output of the "AND" element 25 is reset in the state "1" controlling the starting of the motor-gear reduction unit by means of a pulse "0" sent out on an input 26 of the "AND" element 25. The motor starting orders come from a photo-electric cell actuated when a user of the machine inserts his card in the slot 2 in the wall 1 and from the output of the logic circuit controlling the car processing operations. In either case, the starting orders are zero pulses sent out on the inputs of an "AND" gate 27 whose output is connected to the input 26 of the "AND" element 25.

In order to be able to determine the stopping position of the cylinder 3, the signals coming from the switches 18 and 19 are, moreover, sent out towards the card processing logic element. For the determining of the stopping positions of the cylinder 3 corresponding to the inserting or restituting of a card, (FIGS. 2b, 2d), in which there is a simultaneous passing of the two collecting shoes 16 and 17 on a boss, the signals coming from the switches 18 and 19 are also sent on two inputs of a logic "OR" element 28 whose output is directed towards the card processing logic element.

It must be understood that the logic circuit described has no limiting character; others could be produced without going beyond the scope of the invention. Furthermore, the invention applies whatever the type of cards inserted in the apparatus may be. The cylinder drive means are also optional; this can be the case, for example, with an electromagnet actuating a rack wheel.

What is claimed is:

1. In a device for blocking a slot formed in a wall separating two mediums and for permitting the free passage, in an open position, from one medium to the other, of a flat object, said device comprising a cylindrical element, means for supporting said element for rotating about its axis in front of said slot, an elongated radial opening extending through said element, means for rotating said element about its axis and means for stopping rotation of said element in predetermined angularly spaced positions, the improvement comprising a guide block including a cylindrical opening receiving said cylindrical element and supporting said cylindrical element for rotation about its axis, said block including a passage extending therethrough from said wall and intersecting said element for alignment with the radial opening of said element, and wherein said means for rotating said cylindrical element comprises means for rotating said element in a single direction from position to position and through 360°; whereby, a cord attached to the card for effecting fraudulent passage of the flat object first in one direction through said passage from one side of the block to the other and through said aligned radial opening of said element wherein said opening of said element is aligned with said passage of said block and for subsequent passage in the opposite direction, wraps itself about the cylinder and blocks the passage to prevent the card from being recovered in an unauthorized fashion.

2. The device according to claim 1, wherein said stopping means comprises means for stopping said element successively, in four different angular positions.

3. The device according to claim 2, wherein the element stopping position enabling the passing from one medium to the other of a flat object in a determined direction is at 180° to the passing position in the opposite direction.

* * * * *